(12) United States Patent
Corallo et al.

(10) Patent No.: US 12,497,045 B2
(45) Date of Patent: Dec. 16, 2025

(54) VEHICLE RACE LAUNCH SYSTEMS

(71) Applicant: FCA US LLC, Auburn Hills, MI (US)

(72) Inventors: Giuseppe Corallo, Turin (IT); Gaurav Sadekar, Rochester Hills, MI (US); Nadirsh Patel, Farmington Hills, MI (US); Indrasen Karogal, Auburn Hills, MI (US); Christoph Tischendorf, West Bloomfield, MI (US); Alessandro Lelli, Turin (IT); Dario Morina, Turin (IT); Pier Luca Di Gristina, Turin (IT); Paolo Olivieri, Pecello Torinese (IT); Ashay Sharma, Troy, MI (US); Frederico de Bosio, Turin (IT)

(73) Assignee: FCA US LLC, Auburn Hills, MI (US)

( * ) Notice: Subject to any disclaimer, the term of this patent is extended or adjusted under 35 U.S.C. 154(b) by 141 days.

(21) Appl. No.: 18/430,033

(22) Filed: Feb. 1, 2024

(65) Prior Publication Data
US 2024/0262359 A1 Aug. 8, 2024

Related U.S. Application Data

(60) Provisional application No. 63/483,631, filed on Feb. 7, 2023.

(51) Int. Cl.
*B60W 30/18* (2012.01)
*B60W 10/02* (2006.01)
*B60W 10/06* (2006.01)

(52) U.S. Cl.
CPC ...... *B60W 30/18027* (2013.01); *B60W 10/02* (2013.01); *B60W 10/06* (2013.01)

(58) Field of Classification Search
CPC . B60W 30/18027; B60W 10/02; B60W 10/06
See application file for complete search history.

(56) References Cited

U.S. PATENT DOCUMENTS

| 8,473,134 | B1 * | 6/2013 | Janczak | B60L 50/16 |
| | | | | 701/55 |
| 11,027,731 | B2 * | 6/2021 | Cho | B60K 6/442 |
| 2017/0356414 | A1 * | 12/2017 | Johri | B60W 10/08 |

FOREIGN PATENT DOCUMENTS

| DE | 102010018573 A1 * | 1/2011 | | F02D 29/02 |
| DE | 102015016092 A1 * | 6/2016 | | B60W 20/00 |

* cited by examiner

*Primary Examiner* — Brian P Sweeney
(74) *Attorney, Agent, or Firm* — Jeremy J. Klobucar

(57) ABSTRACT

A hybrid electric vehicle (HEV) includes an internal combustion engine, an electric traction motor, a motor/generator, and a transmission. A launch control system includes a controller having one or more processors programmed to (A) operate the HEV in a vehicle launch preparation phase while the HEV is at a standstill, including (i) commanding the internal combustion engine to an engine speed launch target, (ii) performing a spark retardation on the internal combustion engine to limit wheel torque and generate an engine airflow torque reserve, and (iii) commanding zero torque to the electric traction motor; and (B) operate the HEV in a vehicle launch phase, including (i) reducing or removing the spark retardation, and (ii) commanding the electric traction motor to operate at a predetermined torque, to thereby utilize the engine airflow torque reserve in combination with the electric traction motor to provide increased vehicle acceleration.

18 Claims, 9 Drawing Sheets

VEHICLE RACE LAUNCH SYSTEMS

CROSS-REFERENCE TO RELATED APPLICATION

This application claims the benefit of U.S. Provisional Pat. App. No. 63/483,631, filed Feb. 7, 2023, the contents of which are incorporated herein by reference thereto.

FIELD

The present application relates generally to vehicle launch control systems and, more particularly, to vehicle race launch control systems.

BACKGROUND

Conventional vehicle launch control requires the driver to perform many different tasks leading up to and during the initial launch. This includes tasks such as initiating a launch mode (e.g., a preconfigured mode for optimized powertrain performance), modulating brake/accelerator pedals up to and at a start line, and modulating the accelerator pedal at and throughout the vehicle launch (e.g., in response to a green light signal). However, in some hybrid vehicles, controller sub-functionalities may be ignored due to system architectural bypasses. This may potentially result in unintended race start behaviors, jerky vehicle drivability, increased electric motor stress, and wheel speed/traction control activation. While such systems do work well for their intended purpose, it is desirable to provide continuous improvement in the relevant art to provide greater utility.

SUMMARY

In accordance with one example aspect of the invention, a hybrid electric vehicle (HEV) is provided. In one exemplary implementation, the HEV includes an internal combustion engine, an electric traction motor, a motor/generator configured to start the internal combustion engine, and a transmission. A launch control system includes a controller having one or more processors programmed to (A) operate the HEV in a vehicle launch preparation phase while the HEV is at a standstill, including (i) commanding the internal combustion engine to an engine speed launch target, (ii) performing a spark retardation on the internal combustion engine to limit wheel torque and generate an engine airflow torque reserve, and (iii) commanding zero torque to the electric traction motor; and (B) operate the HEV in a vehicle launch phase, including (i) reducing or removing the spark retardation, and (ii) commanding the electric traction motor to operate at a predetermined torque, to thereby utilize the engine airflow torque reserve in combination with the electric traction motor to provide increased vehicle acceleration.

In addition to the foregoing, the described HEV may include one or more of the following features: wherein the engine speed launch target provides an engine flywheel torque at a level which the controller can perform engine speed control using slip control of a clutch of the transmission; wherein the controller initiates the launch preparation phase when a user presses both a brake pedal and an accelerator pedal; and wherein the controller initiates the launch preparation phase when a user presses both the brake pedal and the accelerator pedal and further holds a paddle shifter.

In addition to the foregoing, the described HEV may include one or more of the following features: wherein the controller subsequently initiates the launch phase when the brake pedal is released; wherein the controller aborts the launch preparation phase if the accelerator pedal is released during the launch preparation phase; wherein the transmission is a hybrid dual clutch transmission; wherein the transmission includes a first clutch, a second clutch, a first sub-transmission, and a second sub-transmission; and wherein the first sub-transmission includes odd gears, and the second sub-transmission includes even gears.

In accordance with another example aspect of the invention, a method of operating a hybrid electric vehicle (HEV) having an internal combustion engine, an electric traction motor, a motor/generator, and a transmission is provided. In one exemplary implementation, the method includes operating, by a controller having one or more processors, the HEV in a vehicle launch preparation phase while the HEV is at a standstill, including (i) commanding the internal combustion engine to an engine speed launch target, (ii) performing a spark retardation on the internal combustion engine to limit wheel torque and generate an engine airflow torque reserve, and (iii) commanding zero torque to the electric traction motor. The method further includes operating, by the controller, the HEV in a vehicle launch phase, including (i) reducing or removing the spark retardation, and (ii) commanding the electric traction motor to operate at a predetermined torque, to thereby utilize the engine airflow torque reserve in combination with the electric traction motor to provide increased vehicle acceleration.

In addition to the foregoing, the described method may include one or more of the following features: wherein the engine speed launch target provides an engine flywheel torque at a level which the controller can perform engine speed control using slip control of a clutch of the transmission; initiating, by the controller, the launch preparation phase when a user presses both a brake pedal and an accelerator pedal; and initiating the launch preparation phase, by the controller, when a user presses both the brake pedal and the accelerator pedal and further holds a paddle shifter.

In addition to the foregoing, the described method may include one or more of the following features: initiating, by the controller, the launch phase when the brake pedal is released; aborting the launch preparation phase, by the controller, if the accelerator pedal is released during the launch preparation phase; wherein the transmission is a hybrid dual clutch transmission; wherein the transmission includes a first clutch, a second clutch, a first sub-transmission, and a second sub-transmission; and wherein the first sub-transmission includes odd gears, and the second sub-transmission includes even gears.

Further areas of applicability of the teachings of the present disclosure will become apparent from the detailed description, claims and the drawings provided hereinafter, wherein like reference numerals refer to like features throughout the several views of the drawings. It should be understood that the detailed description, including disclosed embodiments and drawings references therein, are merely exemplary in nature intended for purposes of illustration only and are not intended to limit the scope of the present disclosure, its application or uses. Thus, variations that do not depart from the gist of the present disclosure are intended to be within the scope of the present disclosure.

DETAILED DESCRIPTION

Figure 1:
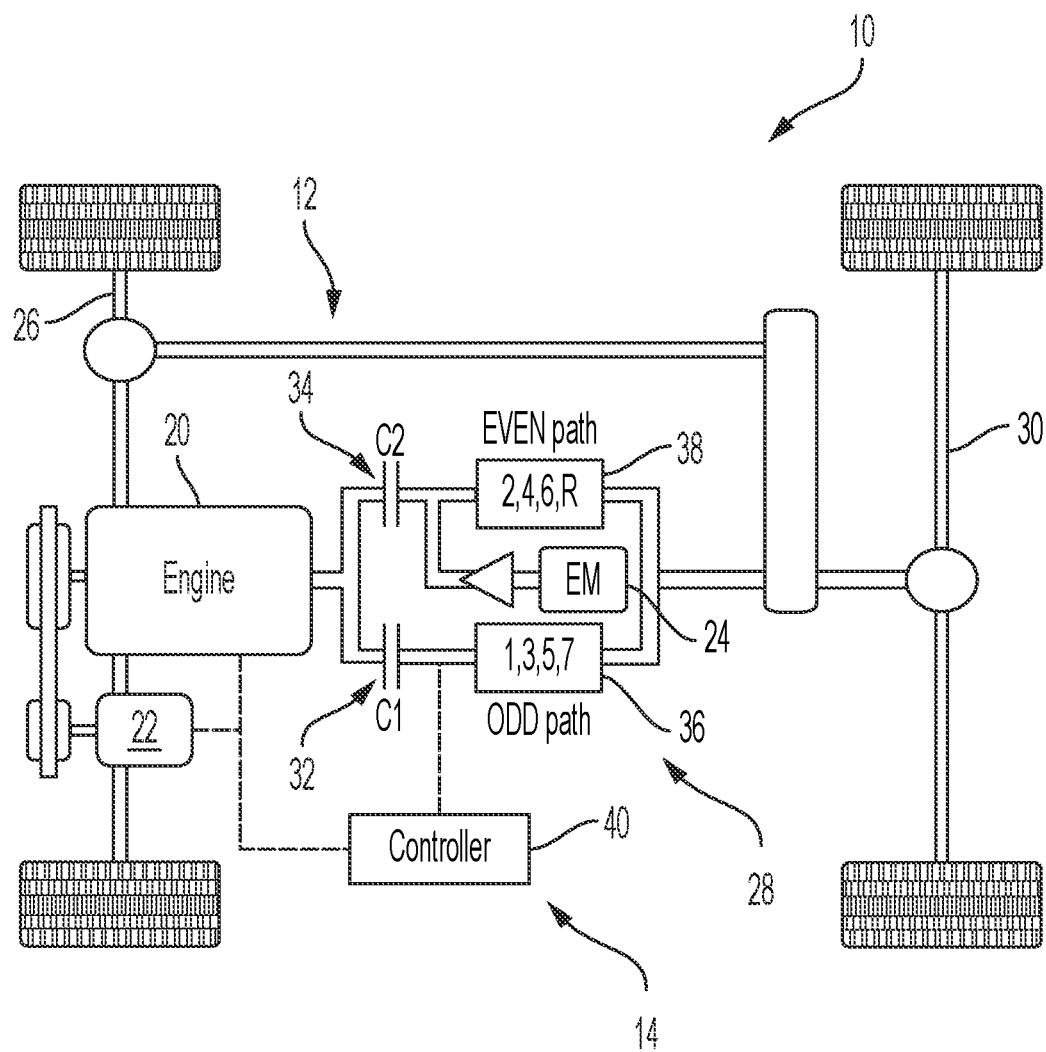
FIG. 1 is a schematic illustration of an example hybrid vehicle in accordance with the principles of the present application.

As previously discussed, vehicle launch techniques in conventional hybrid vehicles can result in unintended race start behavior. In some examples, conventional race start functionality utilized a Transmission Control Unit (TCU) as a master controller to control target engine speed by a combination of clutch torque and engine torque intervention requests. In this way, the TCU managed engine reserve in standstill conditions and subsequently utilized the engine reserves to accelerate the vehicle. However, the TCU could potentially ignore sub-functionalities of other controllers (e.g., Hybrid Control Unit), leading to unintended race start behavior in combination with hill hold and limp home functionalities. Additionally, the TCU could have potential difficulty managing motor torque boost during race start preparation and launch phases. Accordingly, the systems and methods described herein improve vehicle race launch operations.

In the example embodiment, the vehicle includes a controller, such as a hybrid control unit (HCU), configured to manage and coordinate engine torque, electric motor torque, and clutch torque during a vehicle launch from standstill. In a vehicle race mode, the HCU performs a dual phase operation including a preparation phase and a launch phase. Utilizing the HCU as the master controller during the vehicle race mode prevents potential false positive cases during hill hold and limp scenarios, and management of engine, motor, and clutch torque is coordinated during the preparation and launch phases to achieve required target acceleration.

In the preparation phase, the accelerator pedal and the brake pedal are pressed beyond a calibratable threshold while the vehicle is in a standstill condition (e.g., braked in Drive or manual gear 1 or 2). The HCU provides a predetermined engine speed target to the transmission control unit (TCU) and performs engine torque and electric motor torque management such that electric motor torque remains at 0 Nm and the engine flywheel torque is at a predetermined level at which the TCU can perform engine speed control utilizing the launch clutch. For example, the clutch is slipping and controlled in a 'speed mode' such that the system closes the clutch as soon as the engine speed is higher than the target, or opens the clutch if the engine speed is lower than the target. The TCU is configured to request a torque decrease to reduce engine torque if necessary for speed control.

In the example preparation phase, the HCU is configured to ramp engine slow path (airflow) target torque to the required launch target airflow, which is a calibratable value that is a compromise between turbo lag reduction and clutch stress. For example, when the race launch strategy is activated, the engine torque command has a rate limiter until the target is achieved. The HCU is configured to shape engine fast path (spark/fuel) target torque to create an engine speed profile to bring the engine to its target launch speed. For example, the 'fast path' is related to spark advance efficiency, and the 'slow path' is related to air flow actuators (e.g., throttle, turbocharger, VVT, etc.) with the optimal spark advance. Engine torque can be removed by retarding the spark advance from the actual air flow value, and the actual airflow value can be re-established by removing the spark retard. In one example, an engine torque flare is utilized to quickly increase the engine speed and, as soon as the engine speed is on target, the fast path reduction is commenced. The HCU and TCU are configured to communicate through CAN signals to align on race start active, abort, or fault active statuses.

In the launch phase, once the brake pedal is released beyond a calibratable threshold, the HCU is configured to ramp fast path (spark) engine torque towards slow path (airflow) engine torque based on driver demand, and command electric motor torque to allow electric motor contribution for maximum acceleration performance. The TCU is configured to control launch clutch torque to follow transmission input torque during the launch phase. The HCU is configured to control traction and stability interventions through driver demand in case of limited traction. The launch phase is completed once the engine fast path target torque ramp towards engine slow path target torque is completed.

Referring now to FIG. 1, a schematic diagram of a vehicle 10 having a powertrain 12 and a launch control system 14 according to example implementations of the disclosure is illustrated. In the illustrated example, the powertrain 12 includes an internal combustion engine 20 and two electric motors, including a motor generator 22 and a high voltage electric traction motor 24. In the example embodiment, the motor generator 22 is a low voltage (e.g., 12 volt, or 12V) belt-driven starter generator (BSG) unit powered by a 12V battery system and/or 48V battery system via a DC/DC and an inverter (not shown), and the motor 24 is a higher voltage (e.g., 48V) electric traction motor.

The engine 20 combusts a mixture of air and fuel (e.g., gasoline) within cylinders to drive pistons and generate drive torque to a front axle 26 and/or a rear axle 30 via a transmission 28. The motor/generator 22 is utilized to control engine stop/start operations to improve vehicle fuel economy or produce electricity to charge a high voltage battery (not shown), and the electric traction motor/generator 24 is configured to selectively provide drive torque to the front axle 26 and/or the rear axle 30.

In the example embodiment, the transmission 28 is a hybrid dual clutch transmission that generally includes a first clutch 32 (C1), a second clutch 34 (C2), a first sub-transmission 36 with odd gears (e.g., 1, 3, 5, 7 . . . ), and a second sub-transmission 38 with even gears (e.g., 2, 4, 6, 8 . . . ). The first and second clutches 32, 34 are transmission clutches that allow engagement between the engine 20, electric motor/generator 24, and the rest of the transmission 28. The "even" path represents the even gears of the transmission 28, typically used when the electric motor/generator 24 is the element providing propulsion (e.g., EV mode). The "odd" path represents the odd gears of the transmission 28, typically used when the engine 20 is the element providing propulsion. Alternatively, in a hybrid mode with engine 20 ON, both sub-transmissions 36, 38 may be used, but only even path sub-transmission 38 is used for electric traction. So if an even gear is engaged, the motor/generator 24 can contribute to the traction, while the engine 20 can provide torque through clutches 32 or 34. As such, the hybrid powertrain 12 generally has electric gears (even path) for the electric motor/generator 24 to provide torque, and a secondary path (odd gears) for the engine 20 to provide torque without the need for the electric motor/generator 24 to be engaged. It will be appreciated, however, that transmission 28 may have any suitable configuration that enables HEV 10 to function as described herein.

Figure 2:
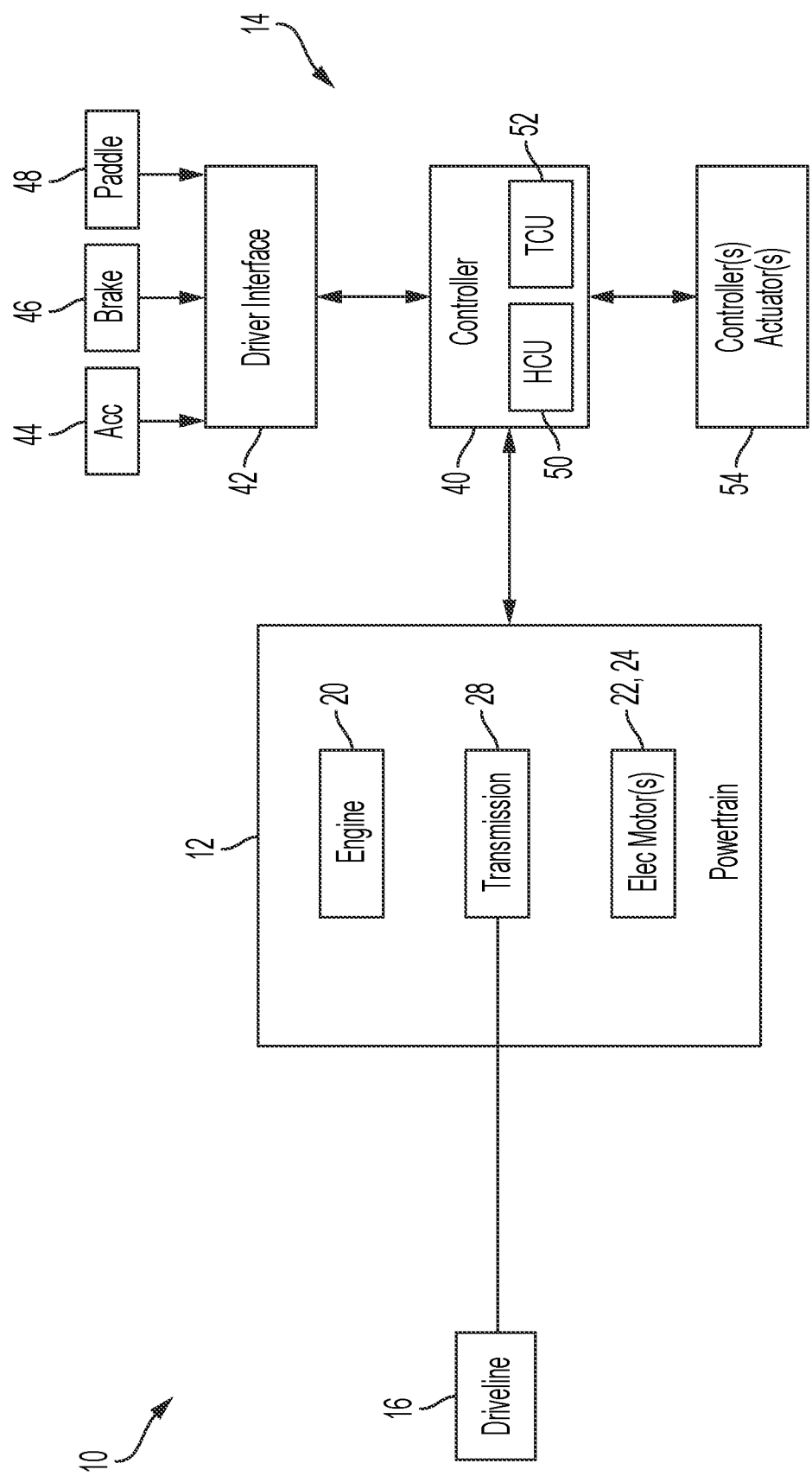
FIG. 2 is a functional block diagram of the vehicle of FIG. 1 with an example race launch control system in accordance with the principles of the present application.

Referring now to FIG. 2, a functional block diagram of the vehicle 10 having powertrain 12 and launch control system 14 according to example implementations of the present disclosure is illustrated. The powertrain 12 includes a torque generating system configured to generate drive torque that is transferred through a driveline 16 of the vehicle 10. The torque generating system includes internal combustion engine 20 and the electric motors 22, 24. The drive torque is transferred to the driveline 16 via transmission 28 (e.g., ST1 and ST2). A controller 40 controls operation of the powertrain 12, for example, such that the powertrain 12 generates an amount of drive torque to satisfy a driver torque request provided via a driver interface 42, including an accelerator pedal 44 and a brake pedal 46, and optionally a steering wheel paddle shifter 48. In the example embodiment, controller 40 includes a hybrid control unit (HCU) 50 and a transmission control unit (TCU) 52. Additionally, the controller 40 receives information from and/or controls other sensor(s)/actuator(s) 54.

In the example embodiment, the launch control system 14 is configured to coordinate and manage engine torque, electric motor torque, and transmission clutch torque in a vehicle launch mode, which may be driver selected/activated via the driver interface 42 by one or more buttons, switches, touchscreens, etc. The controller 40 includes an algorithm that incorporates controlled engine torque intervention using spark retardation for temporary powertrain torque reduction to limit wheel torque while the vehicle 10 is at a standstill. Once vehicle launch is commenced via the launch control system 14, the controller 40 utilizes engine airflow torque reserve along with support from electric motor(s) 22, 24 to provide a maximum boost to accelerate the vehicle 10 under controlled traction. In one example, airflow torque reserve is similar to potential torque, meaning the torque will be available as soon as the fast path torque request is removed. Thus, airflow torque is increased in order to have potential torque ready to use.

Figure 3A:
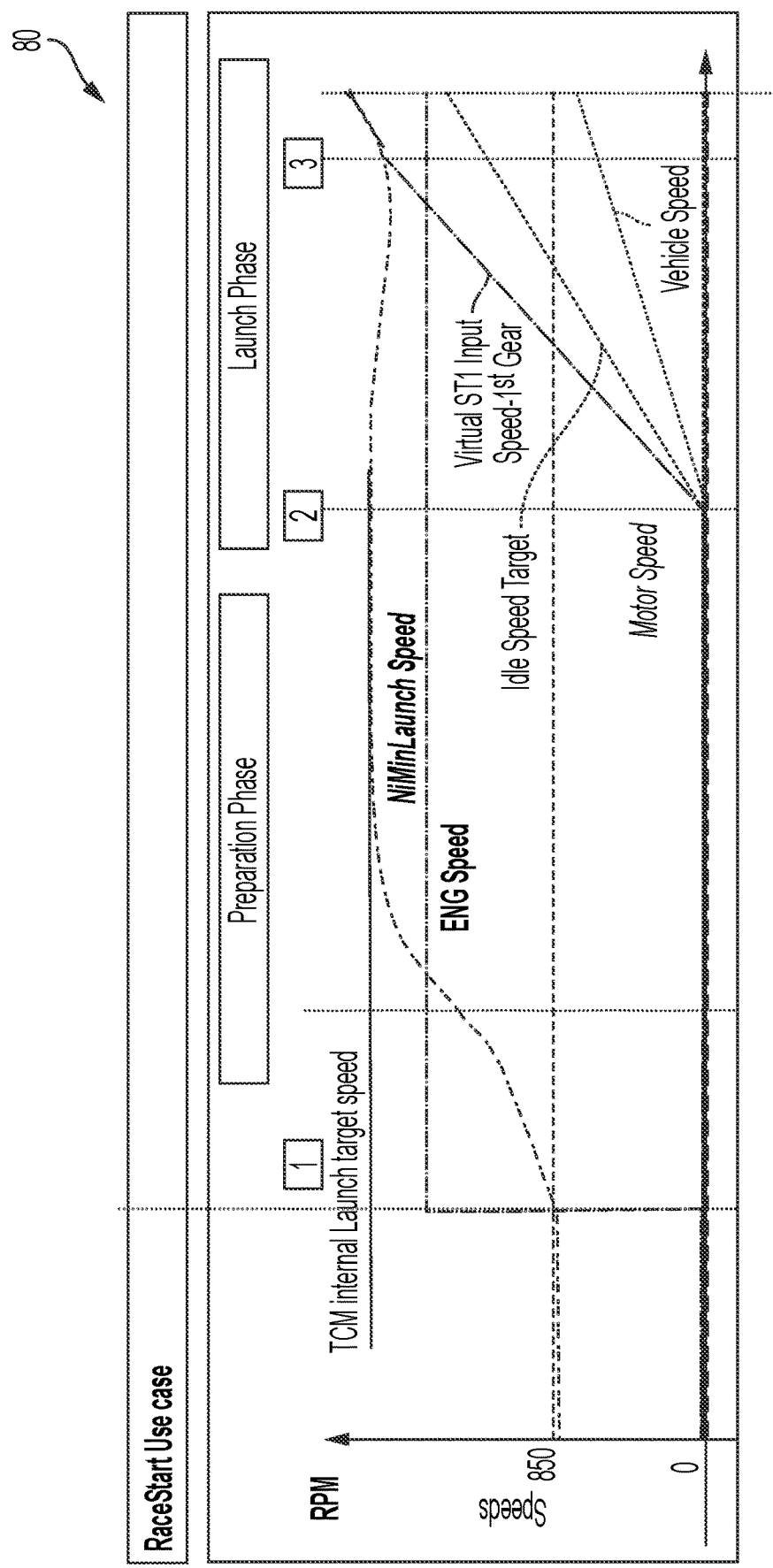
FIGS. 3A-3C illustrate an example hybrid vehicle speed, torque, and status plot in accordance with the principles of the present application.
Figure 3B:
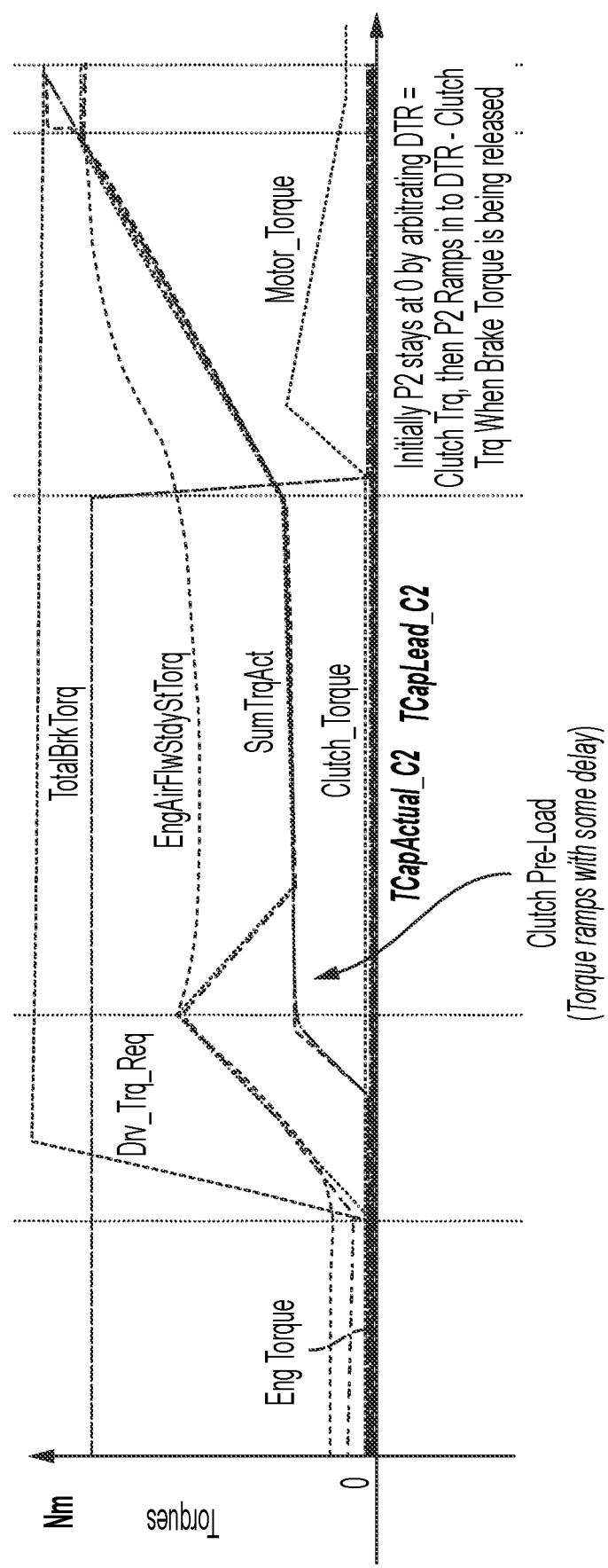
Figure 3C:
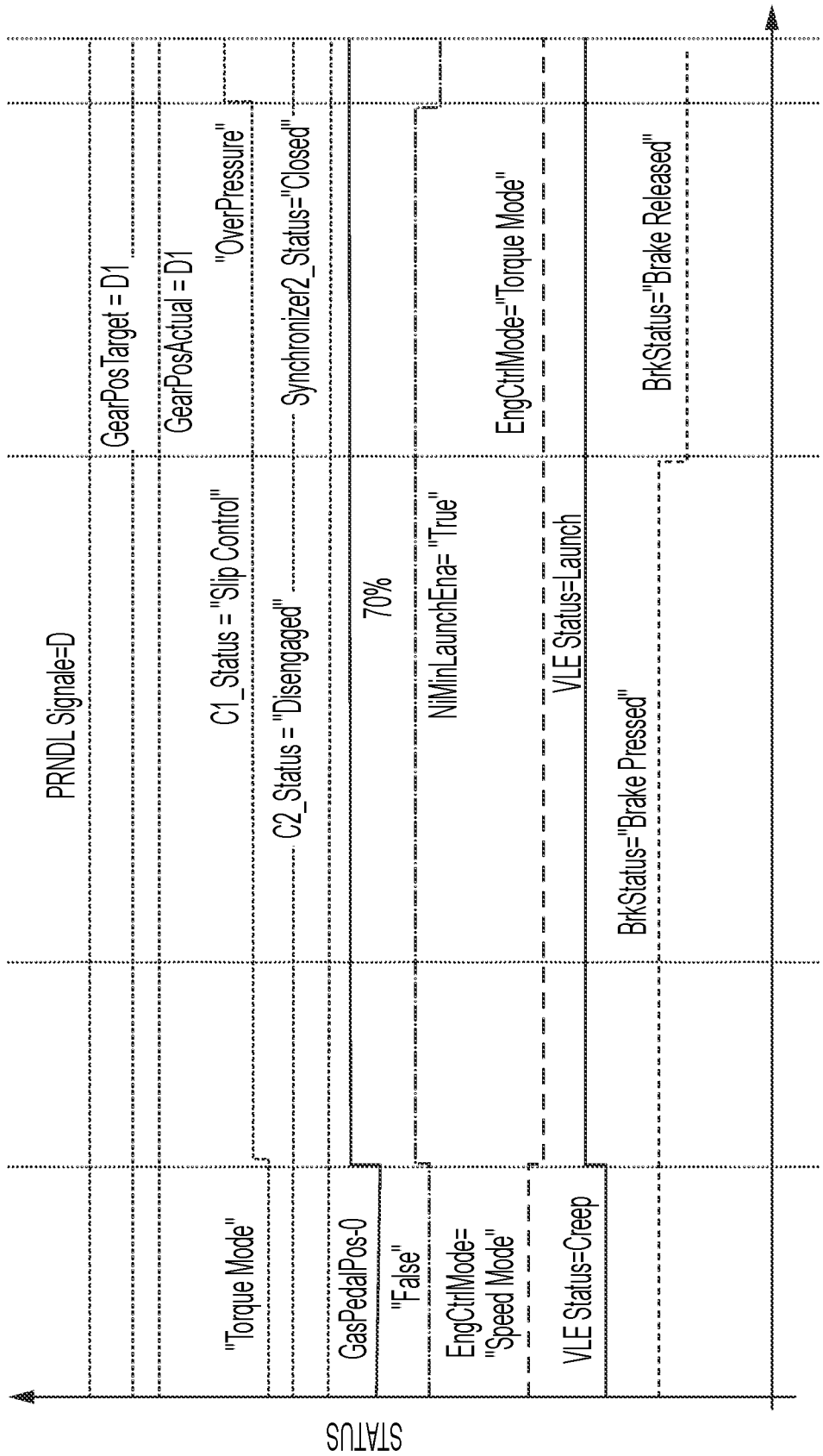

Referring now to FIGS. 3A-3C, an example hybrid vehicle speed, torque, and status plot 80 for the vehicle race launch operation is illustrated. This plot and the following are a use case describing the vehicle race launch scenario and behavior strategy. The plot 80 shows speed, torque, and status for various vehicle components/systems prior to, and during the preparation phase (between '1' and '2') and launch phase (between '2' and '3').

In the example embodiment, GasPedalPos corresponds to a position of accelerator pedal 44, and BrkStatus corresponds to a status of the brake pedal 46. PRNDL_Signal corresponds to the vehicle being in Drive (or other predetermined position), and GearPosTarget or GearPosActual corresponds to manual gear '1' or '2' (e.g., via paddle 48). NiMinLaunch_Speed corresponds to the engine speed target, Motor_Torque corresponds to torque of electric motor (s) 24, and Eng_Torque or SumTrqAct corresponds to engine flywheel torque. Clutch_Torque corresponds to clutch torque, EngAirFlwStdyStTorq (airflow torque) corresponds to engine slow path target torque, and Eng_Torque or SumTrgAct corresponds to engine fast path target torque. TotalBrkTorq corresponds to the brake pedal predetermined threshold, Eng_Torque or SumTrgAct (spark/fuel) corresponds to HCU fast path engine torque, and Drv_Trq_Req corresponds to engine torque based on driver demand.

Figure 4:
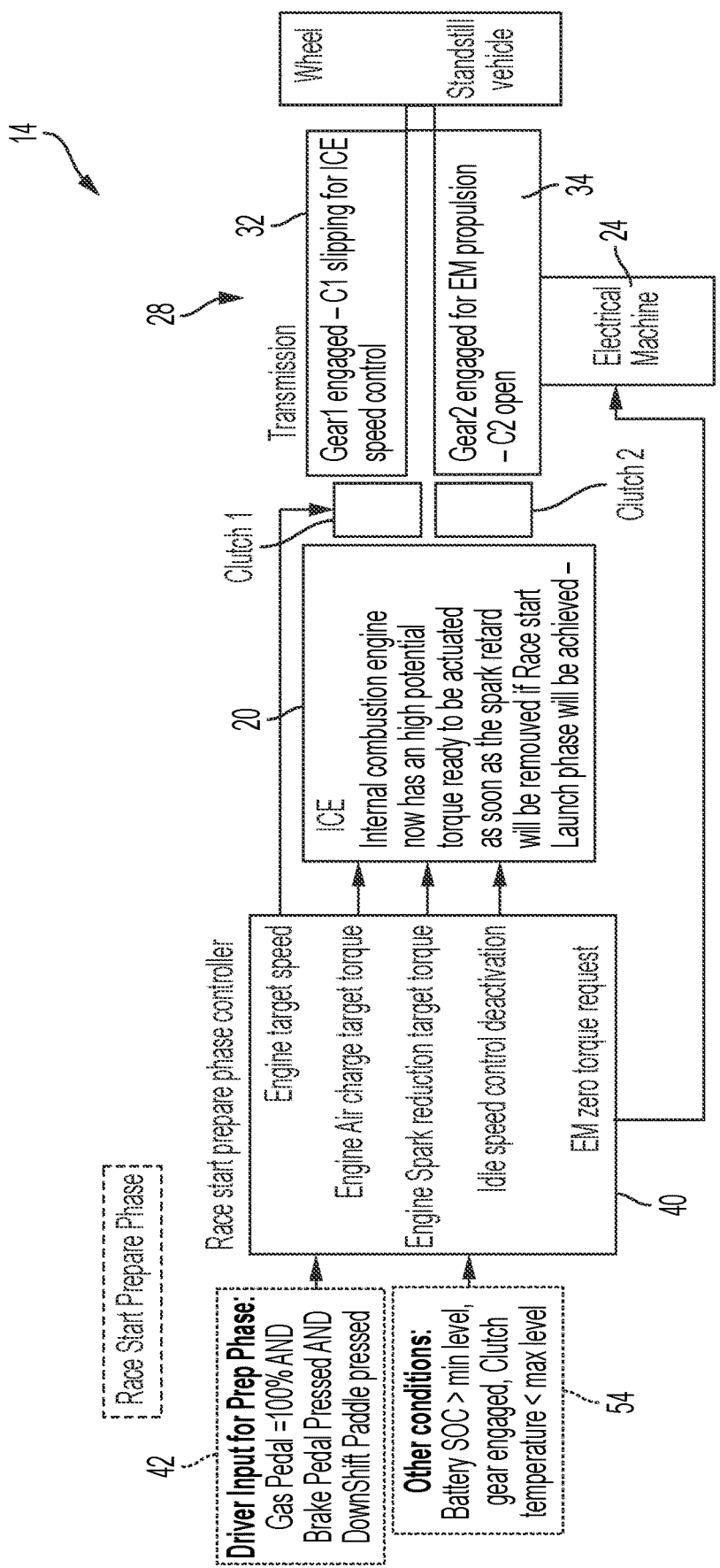
FIG. 4 is an example control diagram of a launch preparation phase of the launch control system of FIG. 2, in accordance with the principles of the present application.
Figure 5:
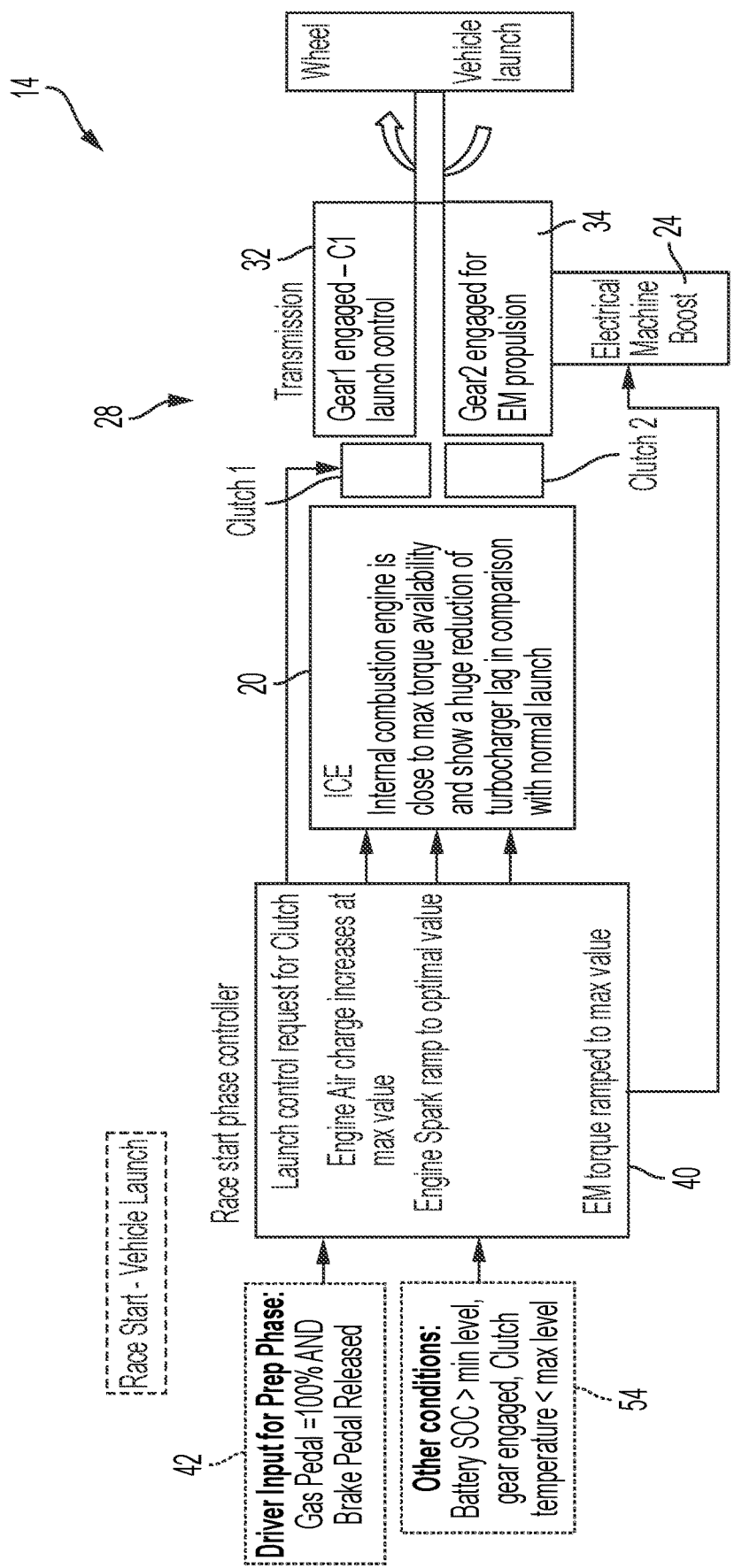
FIG. 5 is an example control diagram of a launch phase of the launch control system of FIG. 2, in accordance with the principles of the present application.
Figure 6:
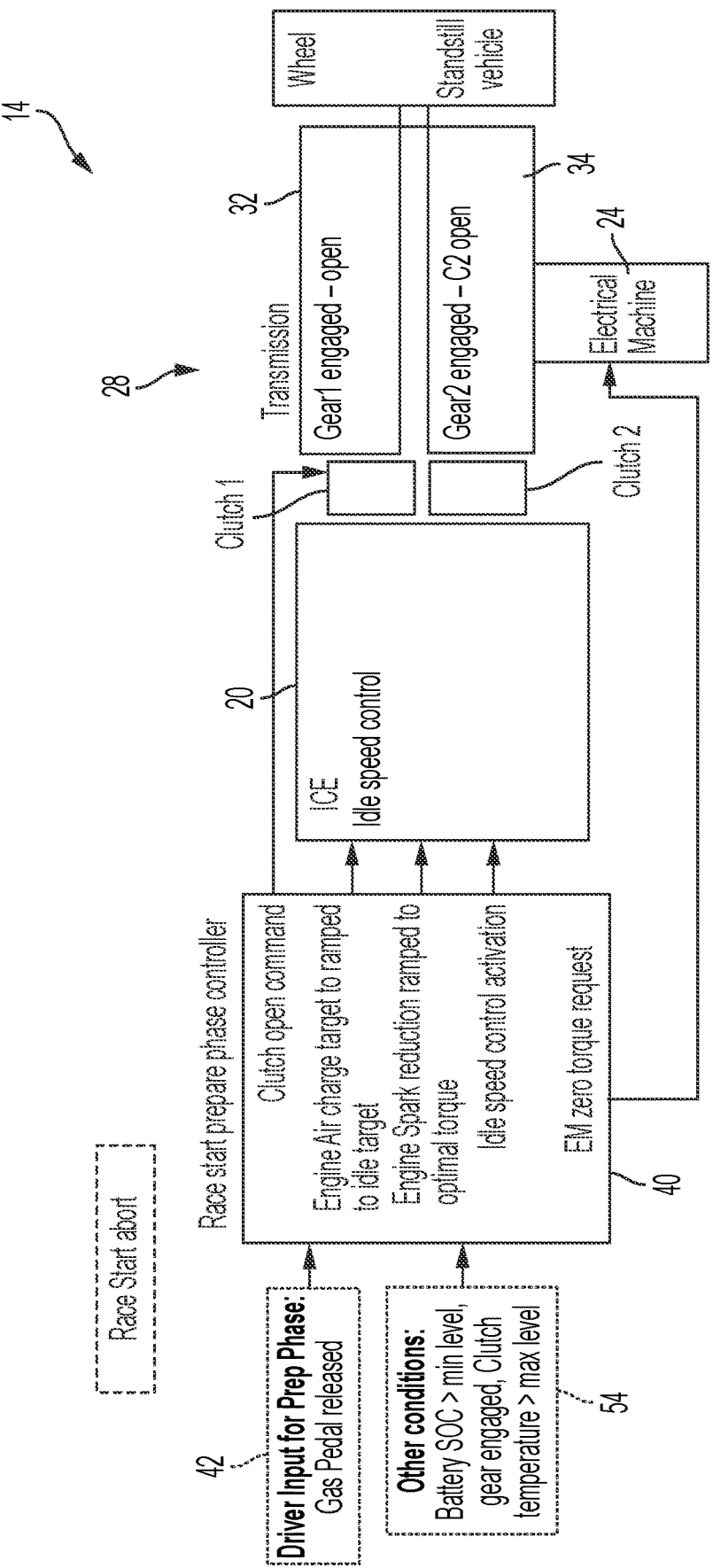
FIG. 6 is an example control diagram of a launch abort phase of the launch control system of FIG. 2, in accordance with the principles of the present application.

Referring now to FIGS. 4-6, example operations of the launch control system 14 are described in more detail. As previously described, during a vehicle launch, the launch control system 14 is configured to provide controlled engine torque intervention using spark retardation to limit the wheel torque while the vehicle is at standstill. Once vehicle launch is initiated, the launch control system 14 utilizes engine airflow torque reserve along with electric motor support to provide maximum boost to accelerate the vehicle under controlled traction. FIG. 4 illustrates an example launch preparation phase control. FIG. 5 illustrates an example launch phase control. FIG. 6 illustrates an example abort launch control.

FIG. 4 illustrates the launch control system 14 in the launch preparation phase, where controller 40 is configured to receive input from the driver interface 42 and sensors/actuators 54. In the example embodiment, to initiate the launch preparation phase, controller 40 receives signals from driver interface 42 indicating the accelerator pedal 44, brake pedal 46, and optionally the steering wheel downshift paddle 48 are pressed. To initiate the launch preparation phase, controller 40 must also receive signals indicating preconditions are satisfied such as, for example, a high voltage battery state of charge is greater than a predetermined minimum level, a drive gear is engaged, a clutch temperature is below a predetermined threshold, etc.

The controller 40 then controls the clutch C1 to provide a predetermined target engine speed, and provides the engine 20 with a predetermined engine air charge target torque, a predetermined engine spark reduction target torque, and a predetermined idle speed control deactivation. The controller 40 also provides a zero torque request to the electric motor(s) 22, 24. Based on these controls, the engine 20 now has a high potential torque ready to be actuated as soon as the spark retard is removed. Further, the transmission 28 is controlled such that clutch C1 is slipping for internal combustion engine speed control, and clutch C2 is open. As such, in the vehicle launch preparation phase, the vehicle wheels are at a standstill.

FIG. 5 illustrates the launch control system 14 in the vehicle launch phase, where controller 40 is configured to receive input from the driver interface 42 and sensors/actuators 54. In the example embodiment, to initiate the vehicle launch, controller 40 receives signals from driver interface 42 indicating the accelerator pedal 44 is pressed and the brake pedal 46 is released. To initiate the vehicle launch phase, controller 40 must also receive signals confirming the previous preconditions are still satisfied (e.g., the high voltage battery state of charge is greater than the predetermined minimum level, the drive gear is engaged, the clutch temperature is below the predetermined threshold, etc.).

The controller 40 then controls the clutch C1 to engage via a launch control request, and commands the engine 20 to increase an engine air charge to a predetermined maximum value, and ramp the engine spark to a predetermined value (non-retarded engine spark). The controller 40 also provides a ramped maximum torque request to the electric motor(s)

22, 24. Based on these controls, the engine 20 is configured to provide maximum torque availability and exhibits a large reduction in turbocharger lag compared to a normal launch without spark retardation. In this way, the transmission 28 is controlled such that clutch C1 is engaged for launch control, and clutch C2 is open while electric motor 24 contributes to propulsion through the gears. As such, in the vehicle launch phase, maximum torque is provided to the wheels to launch the vehicle.

FIG. 6 illustrates the launch control system 14 in the vehicle launch abort phase, where controller 40 is configured to receive input from the driver interface 42 and sensors/actuators 54. In the example embodiment, to abort the vehicle launch, controller 40 receives signals from driver interface 42 indicating the accelerator pedal 44 is released. To abort the vehicle launch phase, controller 40 may also receive signals confirming the previous preconditions are still satisfied (e.g., the high voltage battery state of charge is greater than the predetermined minimum level, the drive gear is engaged, the clutch temperature is below the predetermined threshold, etc.).

The controller 40 then commands clutches C1 and C2 to open, and commands the engine 20 to ramp the engine air charge target to idle, ramp the engine spark reduction to optimal (e.g., normal torque), and activate an idle speed control. The controller 40 also provides a zero torque request to the electric motor(s) 22, 24. Based on these controls, the engine 20 is then operated under an idle speed control and the vehicle remains at a standstill.

Figure 7:
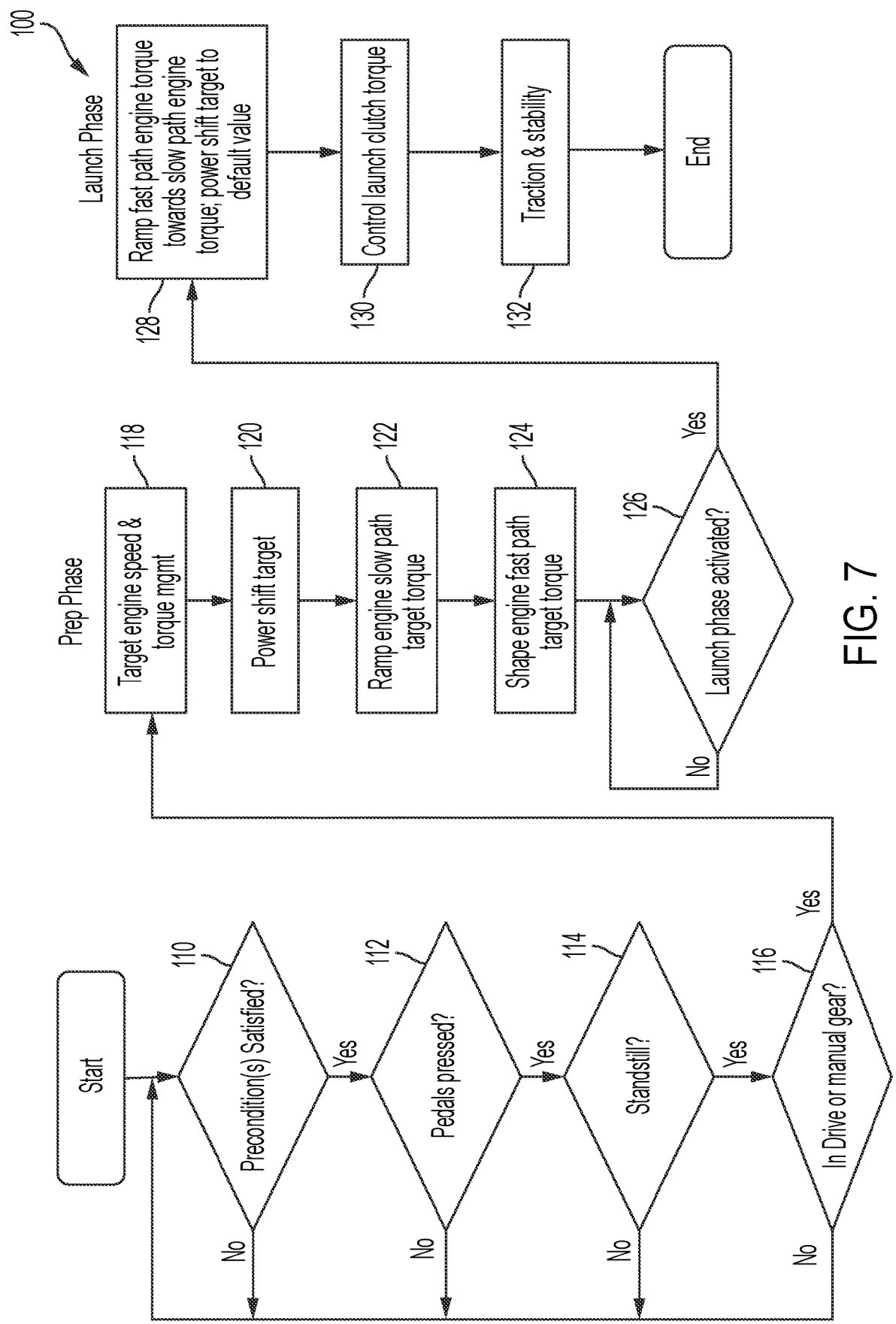
FIG. 7 is a flow diagram of an example race launch control method for a vehicle in accordance with the principles of the present application.

Referring now to FIG. 7, a flow control diagram of an example vehicle race launch control method 100 is illustrated. While the illustrated hybrid vehicle 10 and its components are generally referenced, it will be appreciated that method 100 could be applicable to any suitable hybrid vehicle. In the example embodiment, the method 100 begins at step 110 and the controller 40 determines whether a set of one or more preconditions are satisfied. This could include, for example, whether the engine 20 is on and vehicle 10 is in the launch mode, the high voltage battery state of charge is greater than the predetermined minimum level, the drive gear is engaged, the clutch temperature is below the predetermined threshold. When the precondition(s) are satisfied, the method proceeds to step 112. Otherwise, control ends or returns to step 110.

At step 112, controller 40 determines if the accelerator pedal 44 (GasPedalPos) and brake pedal 46 (BrkStatus) are depressed beyond a predetermined threshold. If no, control returns to step 110. If yes, control proceeds to step 114 and controller 40 determines if the vehicle 10 is in a standstill condition (e.g., wheel speed sensor=zero). If no, control returns to step 110. If yes, control proceeds to step 116 and controller 40 determines if the vehicle 10 is in Drive (PRNDL_Signal) or a predetermined manual gear (e.g., 1 or 2) (GearPosTarget or GearPosActual). If no, control returns to step 110. If yes, control proceeds to step 118.

At step 118, the controller 40 (e.g., HCU 50) provides a target engine speed (NiMinLaunch_Speed) to TCU 52 and performs engine and electric motor torque management such that electric motor torque (Motor_Torque) is zero Nm and engine flywheel torque (Eng_Torque or SumTrqAct) is at a level where TCU 52 can perform engine speed control utilizing the launch clutch (Clutch_Torque). For example, during the launch preparation phase, the TCU 52 controls the engine speed by slipping the launch clutch to thereby raise the engine speed in order to increase the maximum engine torque available for the launch (potential torque). The controller 40 (e.g., TCU 52) can also request a torque decrease to reduce engine torque for speed control.

At step 120, controller 40 controls a power shift target to facilitate preventing unintended electric motor contribution. For example, the power shift target is a net battery power request that HCU 50 utilizes to command the motor torque. A dedicated power shift target is defined in the launch preparation phase to avoid electric motor torque contribution.

At step 122, controller 40 ramps engine slow path (airflow) target torque (airflow torque–EngAirFlwStdyStTorq) to a predetermined required launch target airflow, which is required to establish an airflow torque reserve (e.g., potential torque). At step 124, controller 40 shapes engine fast path (spark/fuel) target torque (Eng_Torque or SumTrqAct) to create an engine speed profile to bring the engine 20 to its launch target speed.

At step 126, controller 40 determines if a launch phase is activated, for example, determining whether the brake pedal 46 is released (TotalBrkTorq). If no, control returns to step 126. If activated, control proceeds to step 128 and controller 40 ramps the fast path (spark/fuel) engine torque (spark/fuel–Eng_Torque or SumTrqAct) towards the slow path (airflow) engine torque (airflow torque–EngAirFlwStdySt-Torq) based on driver demand (e.g., via accelerator pedal 44), and also ramps a power shift target back to a predetermined default value to allow electric motor contribution for improved acceleration.

At step 130, controller 40 controls launch clutch torque (Clutch_Torque) to follow transmission input torque during the launch phase. For example, during the launch phase, driver torque request is reported to the TCU 52 as a Clutch Torque target to follow. The TCU 52 then follows the Clutch Torque target by controlling the Launch Clutch. At step 132, the controller 40 is configured to provide traction and stability intervention through driver demand if limited traction is detected. For example, if the launch control is performed on a low friction surface (e.g., snowy road), the controller 40 is configured to reduce the launch performance to avoid unwanted traction control issues. The method ends when the launch phase is completed and the engine fast path target torque ramp towards the engine slow path target torque is completed.

It will be appreciated that the term "controller" or "module" as used herein refers to any suitable control device or set of multiple control devices that is/are configured to perform at least a portion of the techniques of the present disclosure. Non-limiting examples include an application-specific integrated circuit (ASIC), one or more processors and a non-transitory memory having instructions stored thereon that, when executed by the one or more processors, cause the controller to perform a set of operations corresponding to at least a portion of the techniques of the present disclosure. The one or more processors could be either a single processor or two or more processors operating in a parallel or distributed architecture.

It will be understood that the mixing and matching of features, elements, methodologies, systems and/or functions between various examples may be expressly contemplated herein so that one skilled in the art will appreciate from the present teachings that features, elements, systems and/or functions of one example may be incorporated into another example as appropriate, unless described otherwise above. It will also be understood that the description, including disclosed examples and drawings, is merely exemplary in nature intended for purposes of illustration only and is not intended to limit the scope of the present application, its application or uses. Thus, variations that do not depart from the gist of the present application are intended to be within the scope of the present application.

What is claimed is:

1. A hybrid electric vehicle (HEV), comprising:
   an internal combustion engine;
   an electric traction motor;
   a motor/generator configured to start the internal combustion engine;
   a transmission; and
   a launch control system including a controller having one or more processors, the controller programmed to:
     operate the HEV in a vehicle launch preparation phase while the HEV is at a standstill, including (i) commanding the internal combustion engine to an engine speed launch target, (ii) performing a spark retardation on the internal combustion engine to limit wheel torque and generate an engine airflow torque reserve, and (iii) commanding zero torque to the electric traction motor; and
     operate the HEV in a vehicle launch phase, including (i) reducing or removing the spark retardation, and (ii) commanding the electric traction motor to operate at a predetermined torque, to thereby utilize the engine airflow torque reserve in combination with the electric traction motor to provide increased vehicle acceleration.

2. The HEV of claim 1, wherein the engine speed launch target provides an engine flywheel torque at a level which the controller can perform engine speed control using slip control of a clutch of the transmission.

3. The HEV of claim 1, wherein the controller initiates the launch preparation phase when a user presses both a brake pedal and an accelerator pedal.

4. The HEV of claim 3, wherein the controller initiates the launch preparation phase when a user presses both the brake pedal and the accelerator pedal and further holds a paddle shifter.

5. The HEV of claim 3, wherein the controller subsequently initiates the launch phase when the brake pedal is released.

6. The HEV of claim 3, wherein the controller aborts the launch preparation phase if the accelerator pedal is released during the launch preparation phase.

7. The HEV of claim 1, wherein the transmission is a hybrid dual clutch transmission.

8. The HEV of claim 7, wherein the transmission includes a first clutch, a second clutch, a first sub-transmission, and a second sub-transmission.

9. The HEV of claim 8, wherein the first sub-transmission includes odd gears, and the second sub-transmission includes even gears.

10. A method of operating a hybrid electric vehicle (HEV) having an internal combustion engine, an electric traction motor, a motor/generator, and a transmission, the method comprising:
    operating, by a controller having one or more processors, the HEV in a vehicle launch preparation phase while the HEV is at a standstill, including (i) commanding the internal combustion engine to an engine speed launch target, (ii) performing a spark retardation on the internal combustion engine to limit wheel torque and generate an engine airflow torque reserve, and (iii) commanding zero torque to the electric traction motor; and
    operating, by the controller, the HEV in a vehicle launch phase, including (i) reducing or removing the spark retardation, and (ii) commanding the electric traction motor to operate at a predetermined torque, to thereby utilize the engine airflow torque reserve in combination with the electric traction motor to provide increased vehicle acceleration.

11. The method of claim 10, wherein the engine speed launch target provides an engine flywheel torque at a level which the controller can perform engine speed control using slip control of a clutch of the transmission.

12. The method of claim 10, further comprising initiating, by the controller, the launch preparation phase when a user presses both a brake pedal and an accelerator pedal.

13. The method of claim 12, further comprising initiating the launch preparation phase, by the controller, when a user presses both the brake pedal and the accelerator pedal and further holds a paddle shifter.

14. The method of claim 12, further comprising initiating, by the controller, the launch phase when the brake pedal is released.

15. The method of claim 12, further comprising aborting the launch preparation phase, by the controller, if the accelerator pedal is released during the launch preparation phase.

16. The method of claim 10, wherein the transmission is a hybrid dual clutch transmission.

17. The method of claim 16, wherein the transmission includes a first clutch, a second clutch, a first sub-transmission, and a second sub-transmission.

18. The method of claim 17, wherein the first sub-transmission includes odd gears, and the second sub-transmission includes even gears.

* * * * *